United States Patent [19]
Otera et al.

[11] Patent Number: 5,844,068
[45] Date of Patent: Dec. 1, 1998

[54] PROCESS FOR THE PREPARATION OF POLYHYDROXYCARBOXYLIC ACID COPOLYMER RESIN

[75] Inventors: Junzo Otera, Okayama; Toru Yano, Hiroshima; Hirokazu Yamamoto, Hiroshima; Nobuyuki Sakuda, Hiroshima, all of Japan

[73] Assignee: Nishikawa Rubber Co., Ltd., Hiroshima, Japan

[21] Appl. No.: 816,139

[22] Filed: Mar. 12, 1997

[30] Foreign Application Priority Data

| Mar. 13, 1996 | [JP] | Japan | 8-056181 |
| Jun. 12, 1996 | [JP] | Japan | 8-151371 |
| Jan. 24, 1997 | [JP] | Japan | 9-011500 |
| Jan. 24, 1997 | [JP] | Japan | 9-011501 |
| Feb. 4, 1997  | [JP] | Japan | 9-021626 |
| Feb. 12, 1997 | [JP] | Japan | 9-027916 |

[51] Int. Cl.$^6$ .................................................. C08G 12/12
[52] U.S. Cl. ....................... 528/361; 528/271; 528/274; 528/275; 528/283; 528/354; 528/357
[58] Field of Search ..................... 528/361, 354, 528/357, 271, 274, 275, 283

[56] References Cited

U.S. PATENT DOCUMENTS

| 5,310,865 | 5/1994 | Enomoto et al. | 528/361 |
| 5,386,004 | 1/1995 | Obuchi et al.  | 528/354 |
| 5,616,783 | 4/1997 | Yoshida et al. | 528/495 |
| 5,646,238 | 7/1997 | Ikeda et al.   | 528/361 |

FOREIGN PATENT DOCUMENTS

| 6-172502 | 6/1994 | Japan | C08G 63/06 |

*Primary Examiner*—Terressa Mosley
*Attorney, Agent, or Firm*—Sughrue, Mion, Zinn, Macpeak & Seas, PLLC

[57] ABSTRACT

A process for the preparation of a readily hydrolyzable and/or biodegradable polyhydroxycarboxylic acid resin which can be used in agricultural materials, gardening materials, fishery materials, caking materials, medical instruments and materials, etc. and, even when discarded after use, which undergoes hydrolysis and/or is biodegraded into carbon dioxide, water, etc. Also disclosed are a hydrolyzable and/or biodegradable polyhydroxycarboxylic acid resin composition having an increased resin strength and melt viscosity, and a process for the preparation thereof.

35 Claims, No Drawings

PROCESS FOR THE PREPARATION OF POLYHYDROXYCARBOXYLIC ACID COPOLYMER RESIN

FIELD OF THE INVENTION

The present invention relates to a process for the preparation of a hydrolyzable and/or biodegradable polyhydroxycarboxylic acid resin. Furthermore, the present invention also relates to a biodegradable resin composition comprising a polyhydroxycarboxylic acid resin and a process for the preparation thereof.

BACKGROUND OF THE INVENTION

Various resin compositions have heretofore been used as agricultural and gardening materials (e.g., polyvinyl chloride film) and fishery materials (e.g., fishing net made of a polyethylene fiber). These materials are to be discarded sooner or later. Accordingly, resins have been desired which give no source of pollution and undergoes hydrolysis or biodegradation by microorganisms in the soil even when discarded.

SUMMARY OF THE INVENTION

It is therefore an object of the present invention to provide a process for the preparation of a readily hydrolyzable and/or biodegradable polyhydroxycarboxylic acid resin which can be used in agricultural materials, gardening materials, fishery materials, caking materials, medical instruments and materials, etc., and, even when discarded after use, undergoes hydrolysis and/or can be biodegraded into carbon dioxide, water, etc.

Another object of the present invention is to provide a hydrolyzable and/or biodegradable polyhydroxycarboxylic acid resin composition having an increased resin strength and melt viscosity, and to provide a process for the preparation thereof.

A further other object of the present invention is to provide a hydrolyzable and/or biodegradable polyhydroxycarboxylic acid resin composition which exhibits a high melting point, and an increased resin strength and melt viscosity so as to facilitate its foaming by a low boiling solvent method, a gas injection method, a chemical foaming agent method, etc., and to provide a process for the preparation thereof.

Other objects and effects of the present invention will become more apparent from the following description.

A first embodiment of the process for the preparation of a polyhydroxycarboxylic acid resin of the present invention comprises:

adding a polymerization catalyst to a mixture of a hydroxycarboxylic acid and a metal oxide; and then
heating the mixture with stirring under reduced pressure or in the presence of an organic solvent to prepare a copolymer resin; or comprises:
dehydrating or oligomerizing a hydroxycarboxylic acid having added thereto a polymerization catalyst;
adding a metal oxide to the dehydrated or oligomerized hydroxycarboxylic acid to prepare a reaction mixture; and then
heating the reaction mixture with stirring under reduced pressure or in the presence of an organic solvent to prepare a copolymer resin.

A second embodiment of the process for the preparation of a polyhydroxycarboxylic acid resin of the present invention comprises adding a polymerization catalyst to a mixture of (a) at least one of a hydroxycarboxylic acid, a dimerized hydroxycarboxylic acid and an oligomerized hydroxycarboxylic acid with (b) a saccharide, and then dehydropolymerizing the mixture having added thereto the polymerization catalyst.

A third embodiment of the process for the preparation of a polyhydroxycarboxylic acid resin of the present invention comprises:

adding a polymerization catalyst to a mixture of at least one of a hydroxycarboxylic acid, a dimerized hydroxycarboxylic acid and an oligomerized hydroxycarboxylic acid with a zinc compound; and then
heating the mixture having added thereto the polymerization catalyst with stirring under reduced pressure or in a stream of nitrogen to effect polymerization thereof, or subjecting the mixture having added thereto the polymerization catalyst to azeotropic solution dehydropolymerization in an organic solvent.

The biodegradable resin composition of the present invention comprises a hydrolyzable and/or biodegradable polyhydroxycarboxylic acid resin and a filler added to the resin.

The process for the preparation of a biodegradable resin composition of the present invention comprises:

adding a polymerization catalyst to (a) a hydroxycarboxylic acid, (b) a mixture of two or more hydroxycarboxylic acids, (c) a mixture of a hydroxycarboxylic acid and a saccharide or (d) a mixture of a hydroxycarboxylic acid and a metal hydroxide and/or an inorganic acid to prepare a reaction mixture;
subjecting the reaction mixture to azeotropic dehydropolymerization in an organic solvent, or heating the reaction mixture with stirring under reduced pressure to synthesize a polyhydroxycarboxylic acid resin; and then
adding a filler to the polyhydroxycarboxylic acid resin.

DETAILED DESCRIPTION OF THE INVENTION

The first embodiment of the preparation process of a polyhydroxycarboxylic acid resin of the present invention is described in detail below.

The hydroxycarboxylic acid for use in the first embodiment of the present invention is preferably an aliphatic hydroxycarboxylic acid. If the hydroxycarboxylic acid has asymmetric carbon atoms, it may be in any of the D-form, L-form or racemic form. Two or more kinds of hydroxycarboxylic acids may be used in combination. Specific examples of the hydroxycarboxylic acid include lactic acid, glycolic acid, tartaric acid, citric acid, malic acid, hydroxyvaleric acid and 2-hydroxystearic acid.

The polymerization catalyst for use in the polymerization reaction of a hydroxycarboxylic acid in the first embodiment of the present invention is preferably a 1,3-substituted-1,1,3,3-tetraorganodistannoxane, which has a high catalytic activity. The organo group to be connected to the tin atom may be any of a methyl group, ethyl group, propyl group, butyl group, octyl group, allyl group, benzyl group, phenyl group and naphthyl group. Preferred among these organo groups is a butyl group from the standpoint of solubility, cost, etc. The substituent at the 1- and 3-positions may be any of a halogen atom, a thiocyano group, a hydroxyl group, an alkoxy group and a carboxyl group.

The metal oxide for use in the first embodiment of the present invention is preferably a metal hydroxide such as aluminum hydroxide, calcium hydroxide, zinc hydroxide, barium hydroxide and magnesium hydroxide, an anhydride of an inorganic acid such as diphosphorus pentaoxide and tetraphosphorus decaoxide, an inorganic acid such as phosphoric acid, silicic acid and boric acid, a calcium oxide, magnesium oxide, zinc oxide, or mixture thereof.

The organic solvent for use in the first embodiment of the present invention may be any compound which exhibits a boiling point higher than that of water and is incompatible with water. However, D-limonene or decalin (decahydronaphthalene) is preferably used as the organic solvent, because it is a natural organic solvent and therefore gives no adverse effects on the environment or the human body, even when the same remain in the resin.

In accordance with the above described process, a hydrolyzable and/or biodegradable polyhydroxycarboxylic acid copolymer resin can be readily and efficiently prepared. The resin thus prepared undergoes hydrolysis to reduce its molecular weight with the passage of time even when discarded after use. The hydrolyzed products are decomposed by a microorganism in the soil, etc., into carbon dioxide, water, etc.

The second embodiment of the preparation process of a polyhydroxycarboxylic acid resin of the present invention is described in detail below.

Examples of the hydroxycarboxylic acid for use in the second embodiment of the present invention include lactic acid, glycolic acid, tartaric acid, citric acid, malic acid, hydroxyvaleric acid, 2-hydroxystearic acid, salicylic acid, o-hydroxycinnamic acid and a mixture thereof.

Examples of the dimerized hydroxycarboxylic acid or oligomerized hydroxycarboxylic acid for use in the second embodiment of the present invention include dimers and oligomers of lactic acid, glycolic acid, tartaric acid, citric acid, malic acid, hydroxyvaleric acid, 2-hydroxystearic acid and salicylic acid, o-oxycinnamic acid, and mixtures thereof. The dimerized hydroxycarboxylic acid is preferably a cyclic dimer, particularly L-lactide. The oligomerized hydroxycarboxylic acid is preferably an oligomerized lactic acid.

The saccharide for use in the second embodiment of the present invention is preferably a natural saccharide. Examples of the saccharide include monosaccharides such as D-glucose, D-fructose, D-mannose and D-galactose, oligosaccharides such as maltose and sucrose, polysaccharides such as starch (e.g., corn starch, sweet potato starch, flour starch), and mixtures thereof.

The polymerization catalyst for use in the polymerization reaction in the second embodiment of the present invention is preferably a 1,3-substituted-1,1,3,3-tetraorganodistannoxane, which has a high catalytic activity. The organo group to be connected to the tin atom may be any of, methyl group, ethyl group, propyl group, butyl group, octyl group, allyl group, benzyl group, phenyl group and naphthyl group. Preferred among these organo groups is a butyl group from the standpoint of solubility, cost, etc. The substituent at the 1- and 3-positions may be any of a halogen atom, a thiocyano group, a hydroxyl group, an alkoxy group and a carboxyl group.

Any known catalyst which is commonly used in ester polymerization reactions may be used as the polymerization catalyst in the polymerization reaction of the second embodiment. However, 1,3-substituted-1,1,3,3-tetraorganodistannoxane is preferably used because of its high catalytic activity and hydrolysis resistance.

The organic solvent for use in the second embodiment may be any compound which exhibits a boiling point higher than that of water and is incompatible with water. However, D-limonene or decalin (decahydronaphthalene) is preferably used as the organic solvent, because it is a natural organic solvent and therefore gives no adverse effects on the environment or the human body even when is remains in the resin. If a cyclic dimer of a hydroxycarboxylic acid and a saccharide are used as starting materials to synthesize a copolymer, the synthesis can be effected by merely heating the mixture of the starting materials and the polymerization catalyst with stirring in a stream of nitrogen. If an oligomerized hydroxycarboxylic acid and a saccharide are used as starting materials to synthesize a copolymer, the reaction mixture may be heated with stirring under reduced pressure to undergo a dehydrocondensation reaction, or may be allowed to undergo an azeotropic dehydrocondensation reaction in an organic solvent. Also, if a hydroxycarboxylic acid and a saccharide are used as starting materials to synthesize a copolymer, the reaction mixture may be heated with stirring under reduced pressure to undergo a dehydrocondensation reaction, or may be allowed to undergo an azeotropic dehydrocondensation reaction in an organic solvent.

In accordance with the above described process, a hydrolyzable and/or biodegradable polyhydroxycarboxylic acid resin can be readily and efficiently prepared in one pot. Even when discarded after use, the resin thus prepared undergoes hydrolysis and/or biodegradation by microorganisms in the soil into carbon dioxide and water with the passage of time. The polymer thus obtained undergoes decomposition at a higher rate when provided with a monosaccharide or polysaccharide as in the present invention, as compared to a polymer obtained by polymerization of a hydroxycarboxylic acid alone.

The third embodiment of the preparation process of a polyhydroxycarboxylic acid resin of the present invention is described in detail below.

In the third embodiment of the present invention, if a hydroxycarboxylic acid or oligomerized hydroxycarboxylic acid and a zinc compound are used as starting materials to synthesize a copolymer, the polymerization can be effected by a process comprising (1) adding a polymerization catalyst to the mixture of starting materials, and (2) heating it with stirring under reduced pressure to undergo cause dehydropolymerization or allowing it the mixture to undergo azeotropic dehydration solution polymerization.

The organic solvent for use in the azeotropic dehydration solution polymerization may be any known compound as long as it is immiscible with water. However, D-limonene or decalin (decahydronaphthalene) is preferably used as the organic solvent, because it has a boiling point suitable for the reaction, are natural organic solvents and give no adverse effects on the environment or the human body even when the same remain in the resin.

On the other hand, if a dimerized hydroxycarboxylic acid and a zinc compound are used as starting materials to synthesize a copolymer, the polymerization can be effected by merely, adding a polymerization catalyst to the mixture of the starting materials, and heating the same with stirring in a stream of nitrogen.

Examples of the hydroxycarboxylic acid for use in the third embodiment of the present invention include lactic acid, glycolic acid, tartaric acid, citric acid, malic acid, hydroxyvaleric acid, 2-hydroxystearic acid, salicylic acid, o-hydroxycinnamic acid, and mixtures thereof. Preferred among these hydroxycarboxylic acids are lactic acid and glycolic acid from the standpoint of availability, etc.

Examples of the dimerized hydroxycarboxylic acid and oligomerized hydroxycarboxylic acid for use in the third embodiment of the present invention include dimers and oligomers of lactic acid, glycolic acid, tartaric acid, citric acid, malic acid, hydroxyvaleric acid, 2-hydroxystearic acid, salicylic acid and o-hydroxycinnamic acid, and mixtures thereof. The dimerized hydroxycarboxylic acid is preferably a cyclic dimer, particularly D- or L-lactide (e.g., glycolide).

The oligomerized hydroxycarboxylic acid is preferably an oligomerized lactic acid or oligomerized glycolic acid.

The zinc compound for use in the third embodiment of the present invention may be any of metallic zinc, zinc oxide, organic acid salts of zinc such as zinc acetate and zinc lactate, zinc halides such as zinc chloride, alkoxy zinc compounds such as zinc acetyl acetonate and organic zinc compounds such as diethyl zinc and mixtures thereof.

The polymerization catalyst for use in the polymerization reaction of a hydroxycarboxylic acid, dimerized hydroxycarboxylic acid or oligomerized hydroxycarboxylic acid with a zinc compound may be any esterification catalyst which is commonly used, but 1,3-substituted-1,1,3,3-tetraorganodistannoxane is preferably used in the third embodiment of the present invention. The organo group to be connected to the tin atom may be any of a methyl group, ethyl group, propyl group, butyl group, octyl group, allyl group, benzyl group, phenyl group and naphthyl group. Preferred among these organo groups is a butyl group from the standpoint of solubility, cost, etc. The substituent at the 1- and 3-positions may be any of a halogen atom, thiocyano group, hydroxyl group, alkoxy group and carboxyl group.

In accordance with the above described process, a hydrolyzable and/or biodegradable polyhydroxycarboxylic acid resin can be readily and efficiently prepared in one pot. Even when discarded after use, the resin thus prepared undergoes hydrolysis and/or biodegradation by microorganisms in the soil into carbon dioxide and water with the passage of time.

The biodegradable resin composition according to the present invention is described in detail below.

The biodegradable resin composition according to the present invention comprises a polyhydroxycarboxylic acid resin and a filler added to the resin. The process for the preparation of a biodegradable resin composition according to the present invention comprises (1) adding a polymerization catalyst to (a) a hydroxycarboxylic acid, (b) a mixture of two or more kinds of hydroxycarboxylic acids, (c) a mixture of a hydroxycarboxylic acid with a saccharide or (d) a mixture of a hydroxycarboxylic acid with a metal hydroxide and/or inorganic acid, (2) allowing the reaction mixture to undergo azeotropic dehydropolymerization in an organic solvent, or heating the reaction mixture with stirring under reduced pressure to synthesize a polyhydroxycarboxylic acid resin and then (3) adding a filler to the polyhydroxycarboxylic acid resin.

The polyhydroxycarboxylic acid resin for use in the biodegradable resin composition of the present invention is an aliphatic carboxylic acid having a hydroxyl group. The polyhydroxycarboxylic acid resin can be obtained by the polymerization of one or more kinds of hydroxycarboxylic acids, and the hydroxycarboxylic acid for use herein may be in any of D-form, L-form and racemic form in case having an asymmetric carbon atom. Instead of the hydroxycarboxylic acid polymer, a copolymer synthesized from mixture of a hydroxycarboxylic acid and a starch or from a mixture of a hydroxycarboxylic acid and a metal hydroxide and/or inorganic acid may be used.

The filler for use in the biodegradable resin composition of the present invention may be any ordinary white carbon such as silica, aluminum hydroxide and titanium oxide. Preferred among these fillers is silica, which can exert a high reinforcing effect. Further preferable is fumed silica, which has a less water content and provides a less drop of molecular weight due to hydrolysis, taking into account the miscibility with the molten polyhydroxycarboxylic acid. Specific examples of fumed silica include #130, #200, R972 and R974 available from Nihon Aerogel K.K., and MT-10 and MT-20 available from Tokuyama Co., Ltd.

The addition amount of the filler is preferably from 1 to 300 parts by weight per 100 parts by weight of the polyhydroxycarboxylic acid resin. If the addition amount of the filler falls below 1 part by weight, the desired thickening effect cannot be exerted. On the contrary, if the addition amount of the filler exceeds 300 parts by weight, the resulting biodegradable resin composition exhibits a remarkably increased viscosity, to thereby reduce its workability. The kneading of the resin with the filler can be accomplished by means of any of extruder, kneader, roll and mixer.

In another embodiment, carbon black is used as the filler for use in the biodegradable resin composition of the present invention.

The addition of carbon black to the biodegradable resin composition as a filler makes it possible to raise the melting point of the resin as well as the strength and melt viscosity of the resin.

The carbon black for use as the filler of the present invention may be either an activated carbon or inactivated carbon. Examples of the inactivated carbon include hard carbon, and soft carbon.

The addition amount of the carbon black is preferably from 1 to 300 parts by weight per 100 parts by weight of the polyhydroxycarboxylic acid resin. If the addition amount of the carbon black falls below 1 part by weight, the desired thickening effect cannot be exerted. On the contrary, if the addition amount of carbon black exceeds 300 parts by weight, the resulting biodegradable resin composition exhibits a remarkably increased viscosity to thereby reduce its workability. The kneading of the resin with carbon black can be accomplished by means of any of extruder, kneader, roll and mixer.

The catalyst for use in the polymerization of hydroxycarboxylic acid may be any common catalyst for use in ester polymerization, but 1,3-substituted-1,1,3,3-tetraorganodistannoxane is preferred because of its high catalyst activity and hydrolysis resistance. The organo group to be connected to the tin atom may be any of methyl group, ethyl group, propyl group, butyl group, octyl group, allyl group, benzyl group, phenyl group and naphthyl group. The substituent at the 1- and 3-positions may be any of halogen atom, thiocyano group, hydroxyl group, alkoxy group and carboxyl group.

Examples of the hydroxycarboxylic acid for use as a starting material in the synthesis of polyhydroxycarboxylic acid resin include lactic acid, glycolic acid, tartaric acid, citric acid, malic acid, hydroxyvaleric acid, 2-hydroxystearic acid, salicylic acid, o-hydroxycinnamic acid, and mixtures thereof. Particularly preferred among these hydroxycarboxylic acids is lactic acid.

Instead of the hydroxycarboxylic acid, a dimerized hydroxycarboxylic acid or oligomerized hydroxycarboxylic acid may be used.

The saccharide to be copolymerized to the hydroxycarboxylic acid is preferably a natural saccharide. Examples of the saccharide include monosaccharide such as D-glucose, D-fructose, D-mannose and D-galactose, oligosaccharide such as maltose and sucrose, polysaccharide such as starch (e.g., corn starch, sweet potato starch, flour starch), and mixtures thereof.

Examples of the metal hydroxide to be copolymerized to the hydroxycarboxylic acid include aluminum hydroxide, calcium hydroxide, zinc hydroxide, barium hydroxide, magnesium hydroxide, and mixtures thereof. Examples of the inorganic acid include phosphoric acid, silicic acid, phosphoric acid, and mixtures thereof.

Examples of the polymerization catalyst for use in the polymerization or copolymerization reaction of a hydroxycarboxylic acid include 1,3-substituted-1,1,3,3-tetraorganodistanoxane. The organo group to be connected to the tin atom may be any of methyl group, ethyl group, propyl group, butyl group, octyl group, allyl group, benzyl group, phenyl group and naphthyl group. Preferred among these organo groups is butyl group from the standpoint of solubility, cost, etc. The substituent at the 1- and 3-positions may be any of a halogen atom, a thiocyano group, a hydroxyl group, an alkoxy group and a carboxyl group.

The organic solvent for use in the above described reaction may be any solvent which exhibits a boiling point higher than that of water and is incompatible with water. D-limonene or decalin (decahydronaphthalene) is preferably used as the organic solvent, because it is a natural organic solvent and therefore gives no adverse effects on environment or human body even when remain in the resin.

The polyhydroxycarboxylic acid resin having a filler incorporated therein according to the present invention exhibits a higher melt viscosity than a polyhydroxycarboxylic acid resin free of filler, and thus can be readily foamed by a low boiling solvent method, a gas injection method, a chemical foaming agent method, etc.

Even when discarded after used, the polyhydroxycarboxylic acid resin composition according to the present invention is unwilling to adversely effect on the environment. This is because the polyhydroxycarboxylic acid resin undergoes hydrolysis and biodegradation by microorganism in the soil or the like into carbon dioxide and water, and because the white carbon is originally present in a large amount in the soil, such as silicon dioxide, and the carbon black is chemically stable.

The present invention will be described in more detail with reference to the following examples and comparative examples, but the present invention should not be construed as being limited thereto.

EXAMPLE 1

Into a 5-l heatable and depressurizable reaction vessel were charged 20 mol of L-lactic acid, 0.2 mol of aluminum hydroxide and 2 mmol of 1-chloro-3-hydroxy-1,1,3,3-tetrabutyldistanoxane. The reaction system was heated to a temperature of 170° C. with stirring under a pressure of not higher than 30 mmHg for 24 hours. The resulting resin was then measured for weight-average molecular weight. The results were 15,000. For the measurement of molecular weight, a GPC apparatus comprising a liquid chromatography pump Shodex DS-4, a differential refractive index analyzer Shodex RI-71 and a column GPC806M (available from Showa Denko K.K.) was used.

EXAMPLE 2

The same polymerization procedure as in Example 1 was followed, except that 0.2 mol of magnesium hydroxide was used in place of 0.2 mol of aluminum hydroxide used in Example 1. The resulting resin had a weight-average molecular weight of 11,000.

EXAMPLE 3

The same polymerization procedure as in Example 1 was followed, except that 0.2 mol of calcium hydroxide was used in place of 0.2 mol of aluminum hydroxide used in Example 1. The resulting resin had a weight-average molecular weight of 10,000.

EXAMPLE 4

The same polymerization procedure as in Example 1 was followed, except that 20 mol of L-lactic acid, 1 mol of phosphoric acid and 2 mmol of 1,3-dichloro-1,1,3,3-tetrabutyldistanoxane were used in place of the starting materials used in Example 1. The resulting resin had a weight-average molecular weight of 29,000.

EXAMPLE 5

The same polymerization procedure as in Example 1 was followed, except that 20 mol of L-lactic acid, 1 mol of boric acid and 2 mmol of 1,3-dichloro-1,1,3,3-tetrabutyldistanoxane were used in place of the starting materials used in Example 1. The resulting resin had a weight-average molecular weight of 14,000.

COMPARATIVE EXAMPLE 1

The same polymerization procedure as in Example 1 was followed, except that aluminum hydroxide was not added. The resulting resin had a weight-average molecular weight of 25,000.

Hydrolysis Experiment

The copolymer resins and homopolymers obtained in Examples 1 to 5 and comparative Example 1 were each molded into a 2-mm thick sheet which was then dipped in a 0.1N aqueous solution of sodium hydroxide at a temperature of 30° C. for 48 hours. As a result, the sheets of Examples 1 to 5 became brittle and disintegrated while the sheet of comparative Example 1 showed nothing but surface whitening.

As described above, the first embodiment of the preparation process according to the present invention makes it possible to produce a hydrolyzable or biodegradable polyhydroxycarboxylic acid copolymer resin readily and efficiently in one pot. The resin thus obtained can be used as a caking material. Further, the molded articles of the resin of the present invention can be used as agricultural materials, gardening materials or fishery materials. Even when discarded after use, these articles undergo hydrolysis with the passage of time (more easily than lactic acid homopolymer). Further, these articles can be biodegraded by microorganism in the soil to decompose into carbon dioxide, water, etc. and thus can be no polluting sources. Moreover, the polyhydroxycarboxylic acid copolymer resin has a high melt viscosity so as to facilitate its working.

EXAMPLE 6

Into a 500-ml eggplant type flask were charged 2 mol (200 g) of a 90% L-lactic acid, 0.2 mmol (0.098 g) of 1,3-dichloro-1,1,3,3-tetrabutyldistanoxane and 20 g of corn starch. To the reaction system was then added 200 ml of D-limonene as an organic solvent. A T-tube, a 50-ml eggplant type flask for water-receiving and a condenser were then attached to the 500-ml eggplant type flask. The reaction system was heated to a temperature of not higher than boiling point at ordinary pressure for 24 hours to undergo dehydropolymerization reaction. After the termination of the reaction, the reaction system was cooled, and then subjected to decantation to remove the solvent therefrom. The resulting solidified polyhydroxycarboxylic acid resin was then measured for weight-average molecular weight (Mw). The result was 52,000. For the measurement of molecular weight, a GPC apparatus comprising a liquid chromatography pump Shodex DS-4, a differential refractive index analyzer Shodex RI-71 and a column GPCK806M (available from Showa Denko K.K.) was used.

EXAMPLE 7

The same procedure of dehydropolymerization reaction as in Example 6 was followed, except that decalin (decahydronaphthalene) was used in place of D-limonene used in Example 6. The resulting polyhydroxycarboxylic acid resin had an Mw of 80,000.

EXAMPLE 8

The same procedure of dehydropolymerization reaction as in Example 6 was followed, except that 36 g (0.1 mol) of D-glucose was used in place of 20 g of corn starch used in Example 6. The resulting polyhydroxycarboxylic acid resin had an Mw of 6,000.

EXAMPLE 9

The same procedure of dehydropolymerization reaction as in Example 6 was followed, except that 20 g of sweet potato starch was used in place of 20 g of corn starch used in Example 6. The resulting polyhydroxycarboxylic acid resin had an Mw of 55,000.

EXAMPLE 10

The same procedure of dehydropolymerization reaction as in Example 6 was followed, except that 20 g of flour starch was used in place of 20 g of corn starch used in Example 6. The resulting polyhydroxycarboxylic acid resin had an Mw of 19,000.

EXAMPLE 11

The same procedure of dehydropolymerization reaction as in Example 6 was followed, except the use amount of corn starch was changed to 60 g. The resulting polyhydroxycarboxylic acid resin had an Mw of 9,000.

EXAMPLE 12

Into a 5-l depressurizable reaction vessel were charged 20 mol (2 kg) of a 90% L-lactic acid, 2 mmol (0.98 g) of 1,3-dichloro-1,1,3,3-tetrabutyldistanoxane and 200 g of corn starch. The reaction system was then subjected to polymerization at a temperature of 170° C. under reduced pressure for 2 hours. The resulting polyhydroxycarboxylic acid resin had an Mw of 79,000.

COMPARATIVE EXAMPLE 2

The same procedure of dehydropolymerization reaction as in Example 6 was followed, except that corn starch was not used. The resulting polyhydroxycarboxylic acid resin had an Mw of 51,000.

Hydrolysis Experiment

The polyhydroxycarboxylic acid copolymers obtained in Examples 6 to 12 and the polyhydroxycarboxylic acid homopolymer obtained in comparative Example 2 were each molded into a 1-mm thick sheet which was then dipped in a 0.1 N aqueous solution of sodium hydroxide at a temperature of 30° C. for 6 days. The weight change of the sheet between before and after the immersion was then determined. Regarding the respective initial weights as 100, the weights after immersion were 75 for Examples 6, 7, 9, 10, 11 and 12, 70 for Example 8 and 100 for Comparative Example 2.

These results show that the copolymerization of a hydroxycarboxylic acid with a polysaccharide enhances the decomposability of the resin.

As described above, the second embodiment of the preparation process according to the present invention makes it possible to produce a hydrolyzable or biodegradable polyhydroxycarboxylic acid copolymer resin readily and efficiently in one pot. The resin thus obtained can be used as a caking material. Further, the molded articles of the resin of the present invention can be used as agricultural materials, gardening materials or fishery materials. Even when discarded after use, these articles undergo hydrolysis with the passage of time. Further, these articles can be biodegraded by microorganism in the soil to decompose into carbon dioxide, water, etc. and thus can be no polluting sources.

Moreover, the copolymer obtained from hydroxycarboxylic acid and a monosaccharide or polysaccharide undergoes biodegradation at a higher rate than a homopolymer of hydroxycarboxylic acid.

EXAMPLE 13

Into a reaction vessel were charged 1 mol (144 g) of L-lactide, 14.4 g of corn starch and 0.2 mmol (0.1 g) of 1,3-dichloro-1,1,3,3-tetrabutyldistanoxane. The air in the reaction vessel was then replaced by nitrogen. The reaction system was then stirred at a temperature of 180° C. for 24 hours. The resulting lactic acid-starch copolymer had a weight-average molecular weight (Mw) of 57,000.

For the measurement of molecular weight of the polyhydroxycarboxylic acid resin thus obtained, GPC was used. As the solvent, there was used chloroform. The measurement was effected at a temperature of 40° C. and a flow rate of 1.0 ml/min. For the measurement of molecular weight, a GPC apparatus comprising a Type 510 high pressure pump for high speed liquid chromatography (available from Nihon Millipore Limited), Shodex RI-71 (differential refractive index detector available from Showa Denko K.K.) and GPCK806M (column available from Showa Denko K.K.) was used. The molecular weight of the polyhydroxycarboxylic acid resin was calculated in terms of polystyrene as reference.

EXAMPLE 14

Into a reaction vessel were charged 1 mol (100 g) of a 90% L-lactic acid, 10 g of corn starch and 0.1 mmol (50 mg) of 1,3-dichloro-1,1,3,3-tetrabutyldistanoxane. The reaction system was then heated to a temperature of 170° C. with stirring under reduced pressure. The resulting oligomerized lactic acid had a weight-average molecular weight of 1,200. To the oligomerized lactic acid was then added 10 g of corn starch. The reaction mixture was then heated to a temperature of 170° C. with stirring for 17 hours. The resulting lactic acid-starch copolymer had a weight-average molecular weight (Mw) of 28,000.

Evaluation of Biodegradability by Hydrolysis Acceleration Test

It is known that the decomposition of a biodegradable resin by microorganism begins with a hydrolysis causing the molecular weight drop of the resin, followed by the biodegradation of the resin by microorganism. Accordingly, the evaluation of the biodegradability of a biodegradable resin can be accomplished by the evaluation of the hydrolyzability of the resin. In order to evaluate the hydrolyzability of the polyhydroxycarboxylic acid resin, a 2-mm thick sheet of a lactic acid homopolymer having an Mw of 12,000 and a lactic acid-starch copolymer having an Mw of 12,000 were each dipped in a 0.1 N aqueous solution of NaOH for 4 days. The weight drop of the sheet between before and after the immersion was then determined. Regarding the respective initial weights of the sheet as 100, the weights after immersion were 91 for lactic acid homopolymer and 75 for lactic acid-starch copolymer. These results show that the polyhydroxycarboxylic acid resin obtained according to the present invention undergoes biodegradation at a higher rate than polyhydroxycarboxylic acid homopolymer.

As described above, the preparation process according to the present invention makes it possible to produce a hydrolyzable or biodegradable polyhydroxycarboxylic acid copolymer resin readily and efficiently in one pot. The resin thus obtained can be used as a caking material. Further, the molded articles of the resin of the present invention can be used as agricultural materials, gardening materials or fishing materials. Even when discarded after use, these articles undergo hydrolysis with the passage of time or biodegradation by microorganism in the soil to decompose into carbon dioxide and water and thus can be no polluting sources.

EXAMPLE 15

Into a 5-l planetary mixer were charged 3 kg (30 mol) of a 90% L-lactic acid and 1.5 g (3 mmol) of 1,3-dichloro-1,1,3,3-tetrabutyldistanoxane. The reaction system was then stirred at a temperature of 170° C. in vacuo for 24 hours. To the reaction system was then added fumed silica which had been hydrophobically treated on the surface thereof (R-972, available from Nihon Aerogel Co., Ltd.) in an amount of 10 parts by weight per 100 parts by weight of the lactic acid-starch copolymer thus synthesized. The reaction mixture was then stirred at a temperature of 170° C. for 4 hours.

The lactic acid-starch copolymer was measured for melt viscosity at a temperature of 105° C. before and after the addition of the filler. The lactic acid-starch copolymer showed a melt viscosity rise from 2.1 poise (before) to 3.3 poise (after). For the measurement of melt viscosity, a Type CFT-500C constant load extrusion type capillary rheometer was used.

EXAMPLE 16

Into a 5-l planetary mixer were charged 3 kg (30 mol) of a 90% L-lactic acid, 1.5 g (3 mmol) of 1,3-dichloro-1,1,3,3-tetrabutyldistanoxane and 0.3 kg of corn starch. The reaction system was then stirred at a temperature of 170° C. in vacuo for 24 hours. To the reaction system was then added fumed silica (#130 available from Nihon Aerogel Co., Ltd. which had been dried at a temperature of 105° C. for 2 hours) in an amount of 10 parts by weight per 100 parts by weight of the lactic acid-starch copolymer thus synthesized. The reaction mixture was then stirred at a temperature of 170° C. for 4 hours.

The lactic acid-starch copolymer was measured for melt viscosity at a temperature of 105° C. before and after the addition of the filler. The lactic acid-starch copolymer showed a melt viscosity rise from 1.1 poise (before) to 2.5 poise (after).

As described above, in accordance with the present invention, the polyhydroxycarboxylic acid resin composition comprising a filler incorporated therein exhibits a higher resin strength and melt viscosity than the polyhydroxycarboxylic acid resin free of filler and can be readily foamed. Even when discarded after use, the polyhydroxycarboxylic acid resin undergoes hydrolysis and biodegradation by microorganism in the soil into carbon dioxide and water and thus can be no polluting source. On the other hand, the filler, which originally occur in a large amount in the soil, such as silicon dioxide can have little adverse effects on the environment. Accordingly, it is much likely that the molded articles of the polyhydroxycarboxylic acid resin composition can be used as agricultural materials, gardening materials or fishery materials.

EXAMPLE 17

Into a 5-l planetary mixer were charged 3 kg (30 mol) of a 90% L-lactic acid and 1.5 g (3 mmol) of 1,3-dichloro-1,1,3,3-tetrabutyldistanoxane. The reaction system was then stirred at a temperature of 170° C. in vacuo for 24 hours to synthesize a polylactic acid. To the reaction system was then added soft carbon in an amount of 40 parts by weight per 100 parts by weight of the polylactic acid. The reaction mixture was then stirred at a temperature of 170° C. in vacuo for 4 hours. As soft carbon there was used SRF grade carbon black, FEF grade carbon black or HAF grade carbon black.

The polylactic acid showed a melting point rise from 88° C. to 108° C. when carbon black was added thereto. The polylactic acid was measured for melt viscosity before and after the addition of carbon black. As a result, the polylactic acid showed a melt viscosity rise from 19,850 poise (before) to 99,280 poise (after). For the measurement of melting point and melt viscosity, a Type CFT-500C constant load extrusion type capillary rheometer (available from Shimadzu Corp.) was used.

EXAMPLE 18

Into a 5-l planetary mixer were charged 3 kg (30 mol) of a 90% L-lactic acid and 1.5 g (3 mmol) of 1,3-dichloro-1,1,3,3-tetrabutyldistanoxane. The reaction system was then stirred at a temperature of 170° C. in vacuo for 24 hours. To the reaction system was then added activated carbon powder in an amount of 40 parts by weight per 100 parts by weight of the polylactic acid. The reaction mixture was then stirred at a temperature of 170° C. for 4 hours.

The polylactic acid showed a melting point rise from 88° C. to 114° C. when activated carbon powder was added thereto. The polylactic acid was measured for melt viscosity before and after the addition of activated carbon powder. As a result, the polylactic acid showed a melt viscosity rise from 19,850 (before) poise to 45,130 (after).

As described above, in accordance with the present invention, the polyhydroxycarboxylic acid resin composition comprising carbon black added thereto as a filler exhibits a higher melting point, resin strength and melt viscosity than the polyhydroxycarboxylic acid resin free of carbon black and can be readily foamed by a low boiling solvent method, a gas injection method, a chemical foaming agent method, etc. Even when discarded after use, the polyhydroxycarboxylic acid resin undergoes hydrolysis and biodegradation by microorganism in the soil to decompose into carbon dioxide and water and thus can be no polluting source. On the other hand, carbon black is chemically stable and has little adverse effects on the environment. Accordingly, it is much likely that the molded articles of the polyhydroxycarboxylic acid resin composition can be used as agricultural materials, gardening materials or fishery materials.

EXAMPLE 19
Reaction of Hydroxycarboxylic Acid with Zinc Lactate:

Into a 500-ml reaction vessel were charged 1 mol (100 g) of a 90% L-lactic acid, 10 mmol (2.4 g) of zinc lactate and 0.1 mmol (50 mg) of 1,3-dichloro-1,1,3,3-tetrabutyldistanoxane. The reaction system was then heated at a temperature of 170° C. with stirring under reduced pressure for 20 hours. The resulting lactic acid-zinc copolymer had a weight-average molecular weight (Mw) of 8,000.

For the measurement of the molecular weight of the polyhydroxycarboxylic acid resin thus obtained, gel permeation chromatography (GPC) was used. As the solvent there was used chloroform. The measurement was effected at a temperature of 40° C. and a flow rate of 1.0 ml/min. For the measurement, a GPC apparatus comprising a Type 510 high pressure pump for high speed liquid chromatography (available from Nihon Millipore Limited), Shodex RI-71 (differential refractive index detector available from Showa Denko K.K.) and GPCK806M (column available from Showa Denko K.K.) was used. The molecular weight of the polyhydroxycarboxylic acid resin was calculated in terms of polystyrene as reference.

EXAMPLE 20
Reaction of Hydroxycarboxylic Acid with Zinc Lactate:

Into a 500-ml reaction vessel were charged 1 mol (90 g) of D, L-lactic acid, 10 mmol (2.4 g) of zinc lactate, 0.1 mmol (50 mg) of 1,3-dichloro-1,1,3,3-tetrabutyldistanoxane and 100 ml of D-limonene. An apparatus for discharging the produced water from the reaction system (Dean-Stark trap) was then attached on the reaction vessel. The reaction system was then subjected to azeotropic dehydration solution polymerization for 24 hours. The resulting lactic acid-zinc copolymer had a weight-average molecular weight (Mw) of 16,000.

EXAMPLE 21
Reaction of Cyclic Dimer of Hydroxycarboxylic Acid with Zinc Lactate:

Into a 500-ml reaction vessel were charged 1 mol (144 g) of D, L-lactide, 20 mmol (4.8 g) of zinc lactate and 0.2 mmol (0.1 g) of 1,3-dichloro-1,1,3,3-tetrabutyldistanoxane. The air in the reaction vessel was then replaced by nitrogen. The reaction system was then stirred at a temperature of 180° C. for 24 hours. The resulting lactic acid-zinc copolymer had a weight-average molecular weight (Mw) of 27,000.

EXAMPLE 22
Reaction of Oligomerized Hydroxycarboxylic Acid with Zinc Lactate:

Into a 500-ml reaction vessel were charged 1 mol (100 g) of a 90% L-lactic acid and 0.1 mmol (50 mg) of 1,3-dichloro-1,1,3,3-tetrabutyldistanoxane. The reaction system was then heated at a temperature of 170° C. with stirring under reduced pressure for 3 hours. The resulting oligomerized lactic acid had a weight-average molecular weight (Mw) of 800. To the reaction system were then added 10 mmol (2.4 g) of zinc lactate. The reaction system was then heated at a temperature of 170° C. with stirring for 17 hours. The resulting lactic acid-zinc copolymer had a weight-average molecular weight (Mw) of 8,000.

Evaluation of biodegradability by hydrolysis acceleration test

It is known that the decomposition of a biodegradable resin by microorganism begins with a hydrolysis causing the weight drop of the resin, followed by the biodegradation of the resin by microorganism. Accordingly, the evaluation of the biodegradability of a biodegradable resin can be accomplished by the evaluation of the hydrolyzability of the resin. In order to evaluate the hydrolyzability of the polyhydroxycarboxylic acid resin, a 2-mm thick sheet of a lactic acid homopolymer having an Mw of 12,000 and a lactic acid-zinc copolymer having an Mw of 12,000 were each dipped in a 0.1N aqueous solution of NaOH for 4 days. The weight drop of the sheet between before and after the immersion was then determined. Regarding the respective initial weights of the sheet as 100, the weights after the immersion were 91 for lactic acid homopolymer and 65 for lactic acid-zinc copolymer. These results show that the polyhydroxycarboxylic acid resin obtained according to the present invention is readily biodegraded.

As described above, the preparation process according to the present invention makes it possible to produce a hydrolyzable or biodegradable polyhydroxycarboxylic acid copolymer resin readily and efficiently in one pot. The resin thus obtained can be used as agricultural materials, gardening materials, fishery materials, medical tools or medical materials. Even when discarded after use, the resin of the present invention undergoes hydrolysis with the passage of time or biodegradation by microorganism in the soil to decompose into carbon dioxide and water and thus can be no polluting source.

While the invention has been described in detail and with reference to specific embodiments thereof, it will be apparent to one skilled in the art that various changes and modifications can be made therein without departing from the spirit and scope thereof.

What is claimed is:

1. A process for the preparation of a polyhydroxycarboxylic acid resin, which comprises:

adding a polymerization catalyst comprising a 1,3-substituted-1,1,3,3-tetraorganodistanoxane to a mixture of a hydroxycarboxylic acid and a metal oxide; and then heating the mixture with stirring under reduced pressure or in the presence of an organic solvent to prepare a copolymer resin.

2. A process for the preparation of a polyhydroxycarboxylic acid resin, which comprises:

adding a polymerization catalyst comprising a 1,3-substituted-1,1,3,3-tetraorganodistanoxane to a hydroxycarboxylic acid;

dehydrating or oligomerizing the hydroxycarboxylic acid having the polymerization catalyst added thereto;

adding a metal oxide to the dehydrated or oligomerized hydroxycarboxylic acid to prepare a reaction mixture; and then heating the reaction mixture with stirring under reduced pressure or in the presence of an organic solvent to prepare a copolymer resin.

3. The process of claim 1, wherein the hydroxycarboxylic acid is selected from the group consisting of lactic acid, glycolic acid, tartaric acid, citric acid, malic acid, hydroxyvaleric acid, 2-hydroxystearic acid, salicylic acid, o-hydroxyoxycinnamic acid, and mixtures thereof.

4. The process of claim 2, wherein the hydroxycarboxylic acid is selected from the group consisting of lactic acid, glycolic acid, tartaric acid, citric acid, malic acid, hydroxyvaleric acid, 2-hydroxystearic acid, salicylic acid, o-oxycinnamic acid, and mixtures thereof.

5. The process of claim 1, wherein the metal oxide comprises one or more metal compounds selected from the group consisting of metal hydroxides including aluminum hydroxide, calcium hydroxide, zinc hydroxide, barium hydroxide and magnesium hydroxide, anhydrides of inorganic acids including diphosphorus pentaoxide and tetraphosphorus decaoxide, inorganic acids including phosphoric acid, silicic acid and boric acid, and metal oxides including calcium oxide, magnesium oxide and zinc oxide.

6. The process of claim 2, wherein the metal oxide comprises one or more metal compounds selected from the group consisting of metal hydroxides including aluminum hydroxide, calcium hydroxide, zinc hydroxide, barium hydroxide and magnesium hydroxide, anhydrides of inorganic acids including diphosphorus pentaoxide and tetraphosphorus decaoxide, inorganic acids including phosphoric acid, silicic acid and boric acid, and metal oxides including calcium oxide, magnesium oxide and zinc oxide.

7. The process of claim 1, wherein the organic solvent comprises D-limonene or decalin.

8. The process of claim 2, wherein the organic solvent comprises D-limonene or decalin.

9. A process for the preparation of a polyhydroxycarboxylic acid resin, which comprises:
adding a polymerization catalyst comprising a 1,3-substituted-1,1,3,3-tetraorganodistanoxane to a mixture of (a) at least one of a hydroxycarboxylic acid, a dimerized hydroxycarboxylic acid and an oligomerized hydroxycarboxylic acid with (b) a saccharide; and then
dehydropolymerizing the mixture having the polymerization catalyst added thereto.

10. The process of claim 9, wherein the dehydropolymerizing step comprises heating the mixture having the polymerization catalyst with stirring under reduced pressure, or comprises reacting the mixture having the polymerization catalyst in an organic solvent.

11. The process of claim 9, wherein the hydroxycarboxylic acid is selected from the group consisting of lactic acid, glycolic acid, tartaric acid, citric acid, malic acid, hydroxyvaleric acid, 2-hydroxystearic acid, salicylic acid, o-hydroxyoxycinnamic acid, and mixtures thereof.

12. The process of claim 10, wherein the hydroxycarboxylic acid is selected from the group consisting of lactic acid, glycolic acid, tartaric acid, citric acid, malic acid, hydroxyvaleric acid, 2-hydroxystearic acid, salicylic acid, o-hydroxyoxycinnamic acid, and mixtures thereof.

13. The process of claim 9, wherein the saccharide is selected from the group consisting of monosaccharides including D-glucose, D-fructose, D-mannose and D-galactose, oligosaccharides including maltose and sucrose, polysaccharides including corn starch, sweet potato starch and flour starch, and mixtures thereof.

14. The process of claim 9, wherein the organic solvent comprises D-limonene or decalin.

15. A process for the preparation of a polyhydroxycarboxylic acid resin, which comprises:
adding a polymerization catalyst comprising a 1,3-substituted-1,1,3,3-tetraorganodistanoxane to a mixture of (a) at least one of a hydroxycarboxylic acid, a dimerized hydroxycarboxylic acid and an oligomerized hydroxycarboxylic acid with (b) a zinc compound; and then heating the mixture having added thereto the polymerization catalyst with stirring under reduced pressure or in a stream of nitrogen to effect polymerization thereof, or subjecting the mixture having added thereto the polymerization catalyst to azeotropic solution dehydropolymerization in an organic solvent.

16. The process of claim 15, wherein the hydroxycarboxylic acid is selected from the group consisting of lactic acid, glycolic acid, tartaric acid, citric acid, malic acid, hydroxyvaleric acid, 2-hydroxystearic acid, salicylic acid, o-hydroxyoxycinnamic acid, and mixtures thereof.

17. The process of claim 15, wherein the dimerized hydroxycarboxylic acid is L-lactide, D-lactide or a mixture thereof.

18. The process of claim 15, wherein the oligomerized hydroxycarboxylic acid is lactic acid oligomer, glycolic acid oligomer or a mixture thereof.

19. The process of claim 15, wherein the zinc compound is selected from the group consisting of metallic zinc, zinc oxide, organic acid salts of zinc including zinc acetate and zinc lactate, zinc halides including zinc chloride, alkoxy zincs including zinc acetyl acetonate, organic zincs including diethyl zinc, and mixtures thereof.

20. A biodegradable resin composition comprising a polyhydroxycarboxylic acid resin having a filler added to the resin in an amount of from 1 to 300 parts by weight per 100 parts by weight of the resin.

21. The biodegradable resin composition of claim 20, wherein the filler is white carbon.

22. The biodegradable resin composition of claim 21, wherein the white carbon is silica.

23. The biodegradable resin composition of claim 20, wherein the filler is carbon black.

24. The biodegradable resin composition of claim 23, wherein the carbon black is an activated carbon or an inactivated carbon.

25. A process for the preparation of a biodegradable resin composition, which comprises:
adding a polymerization catalyst comprising a 1,3-substituted-1,1,3,3-tetraorganodistanoxane to (a) a hydroxycarboxylic acid, (b) a mixture of two or more hydroxycarboxylic acids, (c) a mixture of a hydroxycarboxylic acid and a saccharide or (d) a mixture of a hydroxycarboxylic acid and a metal hydroxide and/or an inorganic acid to prepare a reaction mixture;
subjecting the reaction mixture to azeotropic dehydropolymerization in an organic solvent, or heating the reaction mixture with stirring under reduced pressure to synthesize a polyhydroxycarboxylic acid resin; and then
adding a filler to the polyhydroxycarboxylic acid resin.

26. The process of claim 25, wherein the filler is white carbon.

27. The process of claim 26, wherein the white carbon is silica.

28. The process of claim 25, wherein the filler is carbon black.

29. The process of claim 28, wherein the carbon black is an activated carbon or an inactivated carbon.

30. The process of claim 25, wherein the hydroxycarboxylic acid is selected from the group consisting of lactic acid, glycolic acid, tartaric acid, citric acid, malic acid, hydroxyvaleric acid, 2-hydroxystearic acid, salicylic acid, o-hydroxyoxycinnamic acid, and mixtures thereof.

31. The process of claim 25, wherein the saccharide is selected from the group consisting of monosaccharides including D-glucose, D-fructose, D-mannose and D-galactose, oligosaccharides including maltose and sucrose, polysaccharides including corn starch, sweet potato starch and flour starch, and mixtures thereof.

32. The process of claim 25, wherein the organic solvent comprises D-limonene or decalin.

33. The biodegradable resin composition of claim 20, wherein said polyhydroxycarboxylic acid resin comprises a polymerized product of (a) a hydroxycarboxylic acid, (b) a mixture of two or more hydroxycarboxylic acids, (c) a mixture of a hydroxycarboxylic acid and a saccharide or (d) a mixture of a hydroxycarboxylic acid and a metal hydroxide and/or an inorganic acid.

34. The biodegradable resin composition of claim 33, wherein said polymerized product is an azeotropic dehydropolymerized product using a catalyst comprising a 1,3 substituted-1,1,3,3-tetraorganodistanoxane.

35. The biodegradable resin composition of claim 20, which is prepared by the process comprising:

adding a polymerization catalyst comprising a 1,3-substituted-1,1,3,3-tetraorganodistanoxane to (a) a hydroxycarboxylic acid, (b) a mixture of two or more hydroxycarboxylic acids, (c) a mixture of a hydroxycarboxylic acid and a saccharide or (d) a mixture of a hydroxycarboxylic acid and a metal hydroxide and/or an inorganic acid to prepare a reaction mixture;

subjecting the reaction mixture to azeotropic dehydropolymerization in an organic solvent, or heating the reaction mixture with stirring under reduced pressure to synthesize a polyhydroxycarboxylic acid resin; and then adding a filler to the polyhydroxycarboxylic acid resin.

* * * * *